UNITED STATES PATENT OFFICE.

MORDUCH L. KAPLAN, OF BROOKLYN, NEW YORK.

GALVANIC CELL.

1,109,128. Specification of Letters Patent. Patented Sept. 1, 1914.

No Drawing. Application filed January 27, 1914. Serial No. 814,726.

*To all whom it may concern:*

Be it known that I, MORDUCH L. KAPLAN, a citizen of the United States, and a resident of Brooklyn, in the county of Kings and State of New York, have invented certain new and useful Improvements in Galvanic Cells, of which the following is a specification.

The object of the present invention is to provide a good depolarizer for the galvanic cell of the Le Clanché type in order to obtain a cell possessing higher powers and at the same time better standing qualities.

I have discovered a new group of manganese derivatives viz: hydrated manganites and have found the same to be excellently suited to use as a depolarizer in galvanic cells. The process of obtaining these manganites is, as follows: To a suspension of manganese carbonate in water heated to about 75 to 80 degrees centigrade a highly diluted solution of $KMnO_4$ is added in small quantities, proceeding with the addition of permanganate only after the disappearance of the red color caused by the prior addition. Working in this way a complete or nearly complete oxidation of the carbonate can be obtained without having to resort to higher temperatures. After adding the theoretical quantity of $KMnO_4$ the product is stirred until the disappearance of the red color of the permanganate and then allowed to settle. After drawing off the mother lye containing the formed $K_2CO_3$ or $KHCO_3$ there remains at the bottom of the reaction vessel a dark blue powder, which for the purpose of removing completely soluble carbonates is washed repeatedly with hot water till a sample of the water, when tested with a drop of $AgNO_3$ solution, does not show the presence of soluble carbonates. The resulting product was dried at about summer heat and on analysis has shown itself to consist of potassium manganite of the formula $Mn_4O_{13}H_9K$ or what is the same $8MnO_2.K_2O.9H_2O$.

The reaction leading to the formation of this salt has to be formulated, as follows:

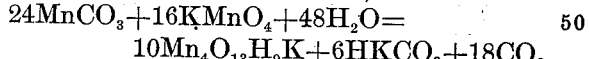
$$10Mn_4O_{13}H_9K + 6HKCO_3 + 18CO_2$$

In the above described manganite the potassium can be partly or wholly substituted by other metals by treating the same with solutions of corresponding metal salts. In this way I succeeded in obtaining among others hydrated manganites of magnesia, of barium and of mercury according to the following equation:

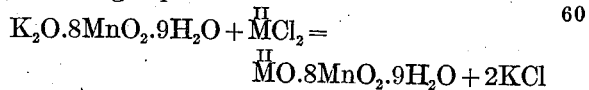

in which $\overset{II}{M}$ = one atom of a bivalent metal or two atoms of a monovalent metal. All these manganites, which have to be considered as neutral salts of a polymanganic acid, show the blue color of the original substance.

Cells made up in the usual way with the above-mentioned products as depolarizing agents have proved to be superior with respect to yields and standing quality.

What I claim is:

1. A galvanic cell containing blue-colored neutral salts of a hydrated poly-manganic acid.

2. A galvanic cell containing neutral salts of a hydrated poly-manganic acid comprising four molecula of manganese dioxid to one equivalent of a base, as a depolarizing agent.

3. A process of obtaining salts of a hydrated poly-manganic acid suitable for use as depolarizing agents in galvanic cells consisting in treating an alkali salt of a poly-manganic acid with a solution of a metal salt.

Signed at New York city, in the county of New York and State of New York, this 26th day of January, A. D. 1914.

MORDUCH L. KAPLAN.

Witnesses:
SAMUEL I. POSEN,
ARTHUR MARION.